United States Patent [19]

Appleford

[11] Patent Number: 4,862,372

[45] Date of Patent: Aug. 29, 1989

[54] APPARATUS AND METHODS FOR GENERATING AIRCRAFT CONTROL COMMANDS USING NONLINEAR FEEDBACK GAIN

[75] Inventor: Lyle R. Appleford, Seattle, Wash.

[73] Assignee: The Boeing Company, Seattle, Wash.

[21] Appl. No.: 801,921

[22] Filed: Nov. 26, 1985

[51] Int. Cl.[4] .............................................. G05D 1/08
[52] U.S. Cl. .................................... 364/433; 244/180
[58] Field of Search ............... 364/433, 428, 424, 427, 364/430; 244/181, 183, 185–187, 193; 342/410–412, 33–35

[56] References Cited

U.S. PATENT DOCUMENTS

| | | | |
|---|---|---|---|
| 2,830,291 | 4/1958 | Hecht et al. ................... | 244/187 X |
| 3,666,929 | 5/1972 | Menn ............................. | 244/183 X |
| 3,901,466 | 8/1975 | Lambregts . | |
| 3,940,673 | 2/1976 | Darlington ..................... | 364/433 |
| 3,989,208 | 11/1976 | Lambregts . | |
| 4,021,009 | 5/1977 | Baker et al. ................... | 244/186 X |
| 4,114,842 | 9/1978 | Hofferber et al. ............. | 364/433 |
| 4,127,249 | 11/1978 | Lambregts . | |
| 4,357,661 | 11/1982 | Lambregts et al. ............ | 244/183 X |
| 4,357,663 | 11/1982 | Robbins et al. ................ | 364/433 |
| 4,377,848 | 3/1983 | Fannigan et al. .............. | 364/433 |
| 4,471,439 | 9/1984 | Robbins et al. ................ | 364/433 |
| 4,536,843 | 8/1985 | Lambregts . | |
| 4,609,988 | 9/1986 | Zweifel ......................... | 364/433 |
| 4,672,548 | 6/1987 | Greenson et al. ............. | 364/433 |

Primary Examiner—Thomas H. Tarcza
Assistant Examiner—Tod Ray Swann
Attorney, Agent, or Firm—Hughes, Cassidy & Multer

[57] ABSTRACT

Altitude rate commands are generated and fed to an aircraft autopilot to cause the aircraft to transition to a non-level flight path which corresponds to a portion of a calculated flight path profile stored in a flight management computer. When capture of the non-level path is initiated, altitude rate commands are generated in accordance with the equation $\dot{h}_{cmd} = \dot{h}_{path} + k_h \Delta h$ where $\dot{h}_{path}$ is the altitude rate of the non-level segment, $\Delta h$ is an altitude difference between current aircraft altitude and an altitude point on the non-level segment, and $k_h$ is an altitude error gain which is a nonlinear inverse function of altitude rate error, $\Delta \dot{h}$, and which is calcuated in accordance with the equation $k_h = k_1 - k_2 |\Delta \dot{h}|$ where $k_1$ and $k_2$ are predetermined constants.

17 Claims, 7 Drawing Sheets

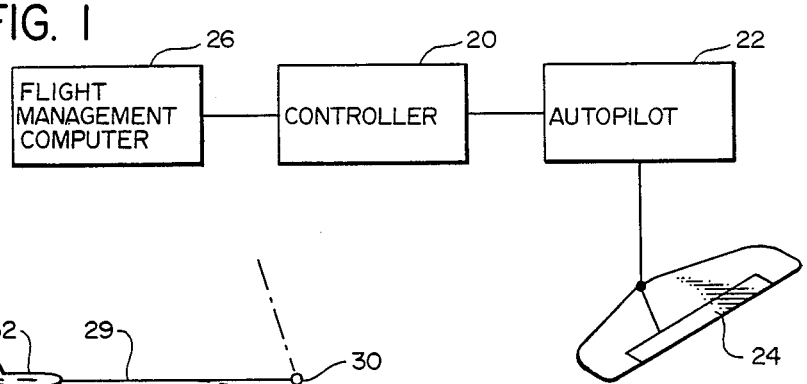
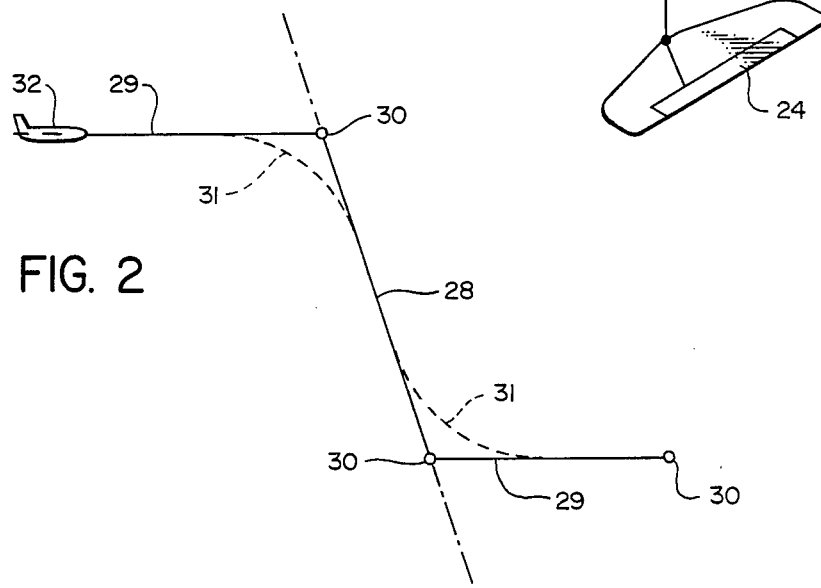
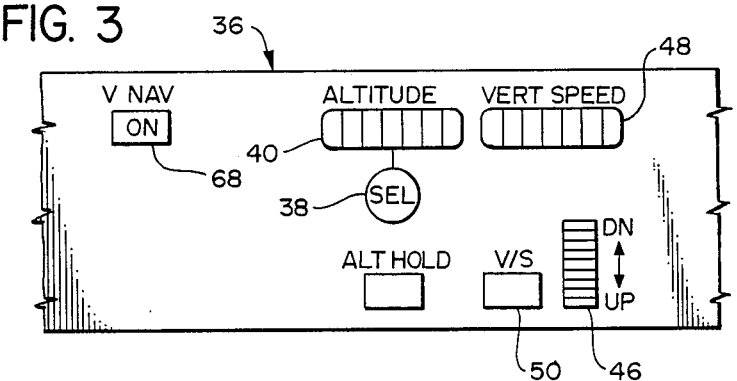

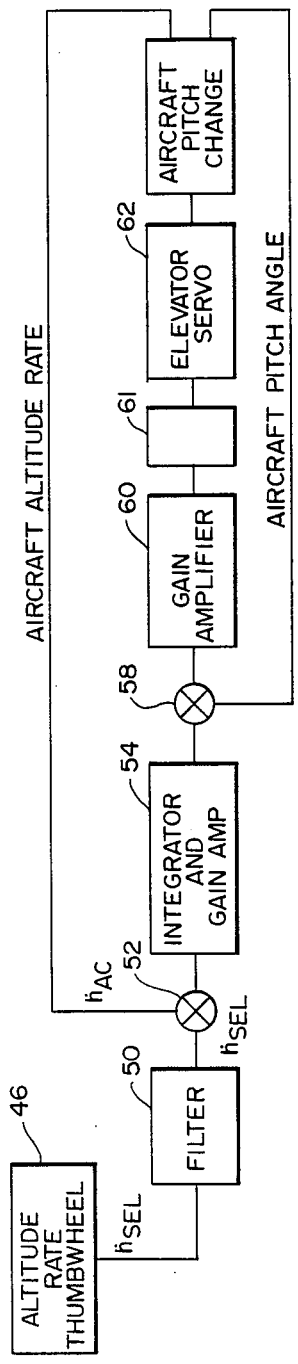
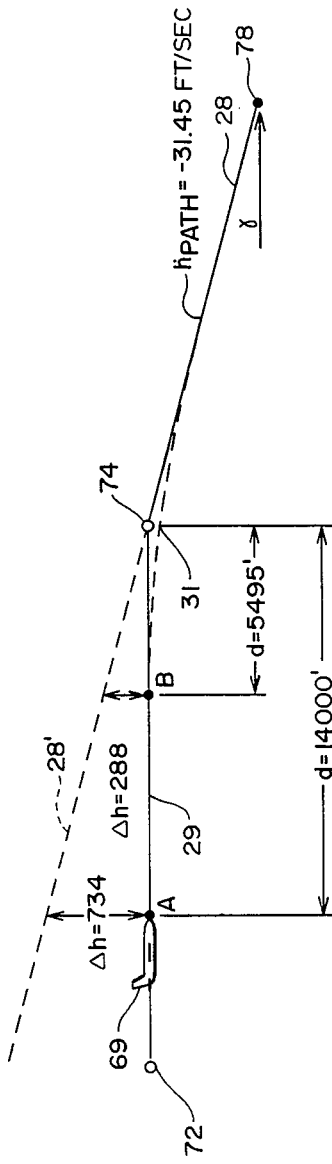
FIG. 4
FIG. 5

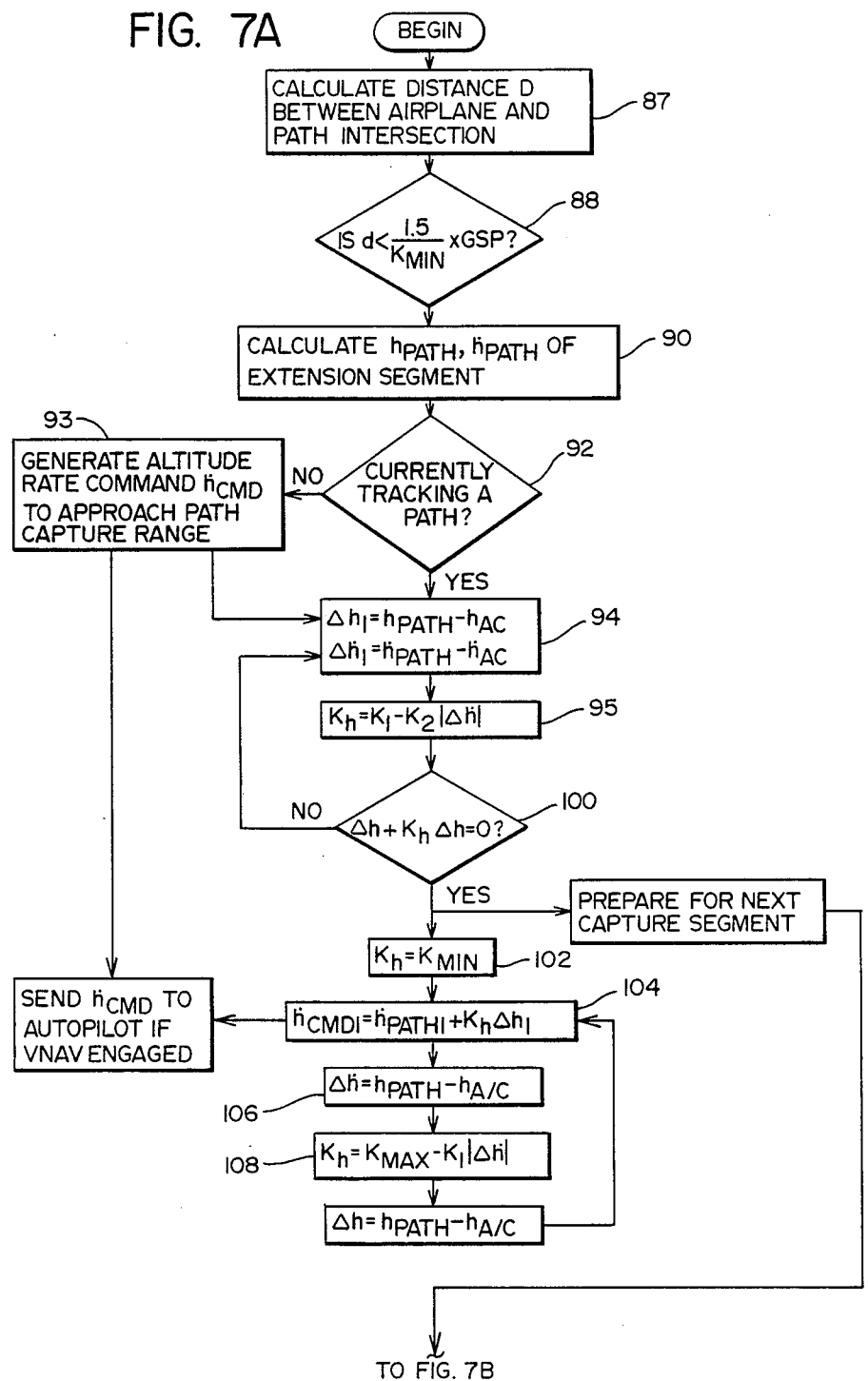

4,862,372

APPARATUS AND METHODS FOR GENERATING AIRCRAFT CONTROL COMMANDS USING NONLINEAR FEEDBACK GAIN

TECHNICAL FIELD

The present invention relates to a control law for interfacing a conventional aircraft autopilot system with an aircraft flight management computer, and more particularly to a controller for generating altitude rate commands, in accordance with a flight path profile stored in the flight management computer, which are fed to the autopilot to capture a non-level path segment of the profile.

BACKGROUND OF THE INVENTION

The flight systems of modern commercial aircraft are operated extensively under the control of one or more computers. For example, the Boeing 737-300 and 757/767 commercial aircraft utilize a flight management computer in which a flight path profile from takeoff to landing may be stored. Flight commands such as aircraft heading, altitude, and altitude rate are generated within the flight management computer and are fed to an autopilot system which manipulates the aircraft flight control surfaces to cause the aircraft to fly a path corresponding to the stored flight path profile.

In order for the integrated system of the autopilot system and the flight management computer to function properly, the computer must generate commands to which the autopilot system is responsive. Integration of the autopilot system with a computer requires an interface controller which generates commands as a function of a stored flight profile to cause the autopilot to respond in the desired manner.

SUMMARY OF THE INVENTION

The embodiments of the present invention described more fully hereinafter pertain to apparatus and methods for generating control commands which are fed to an autopilot system to cause an aircraft to capture a predetermined flight path segment, and preferably to capture a non-level flight path segment. Altitude rate commands, to which the autopilot is responsive, are developed by comparing present aircraft altitude, $h_{ac}$, to the altitude of the upcoming non-level path segment (climb or descent path, $h_{path}$, and generating an error signal $\Delta h$. This altitude error ($\Delta h$) is scaled by an altitude error gain factor $k_h$ and then added to a calculated altitude rate $\dot{h}_{path}$ of the upcoding non-level segment to generate an altitude rate command $\dot{h}_{cmd}$ which is fed to the autopilot.

When the aircraft is outside of a calculated capture range of the non-level segment, altitude rate commands are fed to the autopilot to cause the aircraft to fly toward the non-level path, and to within a calculated capture range. Capture begins when the sum of altitude rate error ($\dot{h}_{ac} - \dot{h}_{path}$) and the scaled altitude error ($\Delta h * k_h$) equal zero. With the initiation of capture, altitude error gain $k_h$ is calculated as a function of altitude rate error, $\Delta \dot{h}$, in accordance with the equation $k_h = k_{max} - k_1 |\Delta \dot{h}|$. The effect of the altitude error gain equation is to increase $k_h$ from a predetermined minimum to a predetermined maximum, $k_{max}$, which is preferably equivalent to the altitude hold gain of the autopilot. The nonlinear increase in the gain factor $k_h$ due to a decrease in $\Delta \dot{h}$ as the aircraft approaches the flight path segment results in a transition to the non-level segment which is smooth with very little overshoot or undershoot.

It is therefore an object of the present invention to provide a control system for generating steering commands to transition an aircraft from a first path to a second path.

It is another object to provide a control system for generating steering commands to transition an aircraft to a non-level flight path.

BRIEF DESCRIPTION OF THE DRAWINGS

These and other objects of the present invention will become more readily apparent upon reading the following Detailed Description and upon reference to the attached drawings in which:

FIG. 1 is a simplified block diagram showing the interrelation of the controller of the present invention with a conventional aircraft flight management computer and a conventional autopilot;

FIG. 2 is a side view of a portion of an exaggerated flight profile including level and non-level segments;

FIG. 3 is a pictorial representation of a portion of a conventional autopilot control panel;

FIG. 4 is a simplified block diagram of a conventional autopilot system which is responsive to altitude rate commands generated from an altitude rate thumbwheel on the aircraft autopilot control panel;

FIG. 5 is a side view of an exaggerated flight path profile including an upward extension of the non-level path;

FIGS. 7A and 7B are flow charts describing the generation of altitude rate commands for capturing the non-level path segment;

Figure 6:
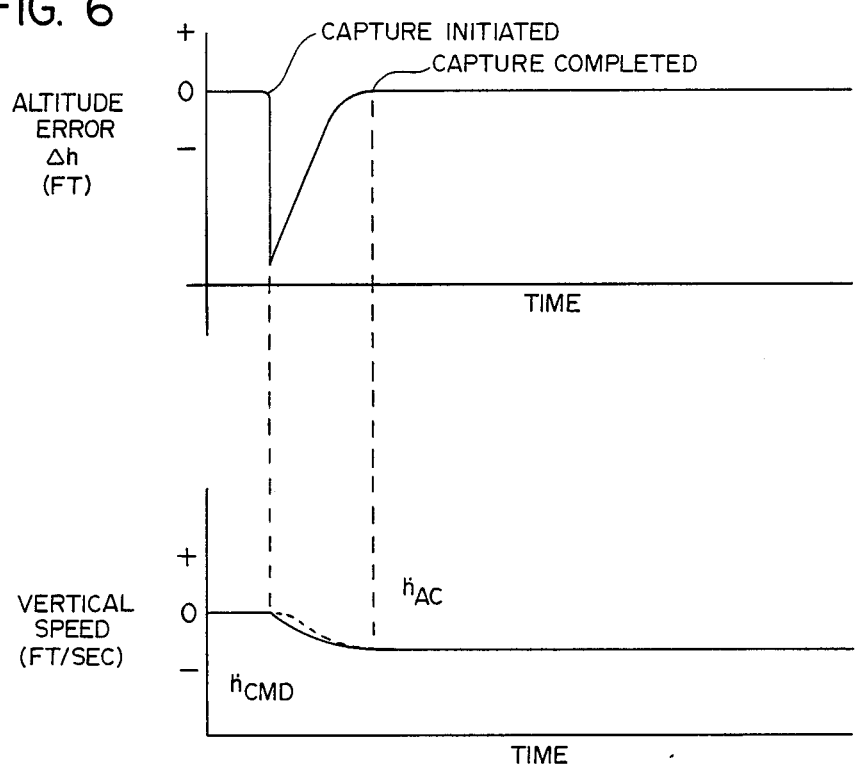
FIG. 6A is a graph of altitude error $\Delta h$ as a function of time.
FIG. 6B is a graph of a commanded altitude rate $\dot{h}_{cmd}$ and actual altitude rate $\dot{h}_{ac}$ as a function of time.

While the present invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the invention is to cover all modifications, equivalents, and alternatives falling within the spirit and scope of the invention.

DETAILED DESCRIPTION OF THE INVENTION

Referring to FIG. 1, a preferred embodiment of the present invention pertains to a controller 20 which generates vertical steering commands which are fed to a conventional aircraft autopilot system 22 to cause movement of aircraft elevators 24. This enables the aircraft to capture and track a predetermined descent or climb flight path in accordance with a flight path profile stored in a conventional flight management computer 26. A side profile of a portion of the projected flight path is shown in FIG. 2 wherein the flight path is made up of a number of non-level segments 28 and level segments 29 which in turn are formed by a number of navigational points 30. Navigational points 30, which are stored in computer 26, are defined in terms of an altitude above a fixed geographical location referenced to earth, e.g., latitude/longitude or bearing/distance from a known navigational aid. Utilizing navigational points 30, flight path segments 28, 29 are calculated in a conventional manner to form the flight path profile. The flight path profile provides a reference path to which current aircraft location is compared in order to generate commands to autopilot 22 to guide aircraft 32 along the projected flight path. In particular, controller 20 generates altitude change steering commands which are fed to autopilot 22 to fly the aircraft along a transition path 31 to intercept and track a non-level segment, e.g. descent segment 28 in FIG. 2. The flight path profile also provides course information for generating commands to steer the aircraft relative to a predetermined course, however this is done in a conventional manner and will not be discussed further herein.

Before proceeding with a discussion of controller 20 and the unique manner in which these altitude change steering commands are generated, a better understanding of the invention will be provided by a discussion of autopilot 22 and flight management computer 26. In a preferred embodiment, autopilot 22, which is typified by the Sperry digital flight control system currently onboard Boeing 737-300 aircraft, includes an altitude hold mode, an airspeed command mode, and a vertical speed control mode. Referring to FIG. 3, during conventional operation, inputs to autopilot 22 are entered by the pilot at an autopilot control panel, indicated at 36, located in the aircraft cockpit. In order to command the autopilot to cause the aircraft to descend, for example, from 35,000 feet to 30,000 feet, the pilot selects the desired altitude by (i) rotating a selector knob 38 until the desired altitude appears in an altitude window 40, and then (ii) engaging a vertical speed button 50. The aircraft is commanded to descend to the desired altitude by rotation of a thumbwheel switch 46 until a desired vertical speed, also referred to as an altitude rate $\dot{h}$, appears in a vertical speed window 48. The autopilot generates the necessary internal commands to cause the aircraft to descend at the selected vertical speed. Autopilot 22 includes an autothrottle function which moves the engine control throttle to an appropriate location so that a selected airspeed is maintained along the non-level segment. On approaching the selected altitude displayed at window 40, the autopilot generates the necessary commands for transitioning the aircraft from a non-level condition to level flight. These commands for capturing and tracking the selected altitude are generated in accordance with conventional altitude acquire/hold control laws present in the autopilot system.

Conventional operation of autopilot system 22 is further illustrated in reference to FIG. 4 where command signal $\dot{h}_{sel}$, which is representative of the altitude rate selected by the pilot at thumbwheel 46, is fed to a low pass filter 50 which removes high frequency transient signals. From filter 50 the signal is fed to an altitude rate feedback summing junction 52 which subtracts the current altitude rate of the aircraft from the altitude rate selected at thumbwheel 46 to generate an altitude rate error signal. This error signal is integrated and amplified at an integrator and gain amplifier 54 to generate an aircraft pitch angle command. The pitch angle command is fed to a pitch angle summing junction 58 where signals representing the current pitch angle of the aircraft are subtracted from the pitch angle signal to generate a pitch angle error signal. The pitch angle error signal is fed to a gain amplifier 60 where the signal is scaled by a selected gain in accordance with a conventional gain function.

Signals output from the gain amplifier 60 are fed in the form of elevator commands via filters 61 to an elevator servo 62 which causes the elevator to deflect in accordance with the received commands thereby producing a change in pitch attitude of the aircraft. During this change in pitch attitude, (1) current aircraft pitch angle is sensed and fed back to summing junction 58 to generate the pitch angle error signal, and (2) current aircraft altitude rate $\dot{h}_{ac}$ is sensed and fed back to summing junction 52 where altitude rate error signals are generated. Thus, a selected altitude rate $\dot{h}_{sel}$ entered at thumbwheel 46 produces a corresponding change in aircraft pitch angle.

Having described the operation of a conventional autopilot system, a further understanding of the present invention will be obtained by a discussion of conventional flight management computer 26 and its operation. Computer 26 is a programmable digital computer which stores information relating to locations of known navigational aids, selected geographical reference points, and waypoints. In order to establish a flight path profile, selected navigational aids, geographical references and waypoints which correspond to the desired route of flight are retrieved from computer 26. By assigning a discrete altitude to each of these selected navigational aids, geographical references and waypoints along the route of flight, navigational points 30 are generated. By connecting each of these navigational points 30, a number of level and non-level path segments are generated which form the flight path profile. Navigation of the aircraft is accomplished by comparing the current location of the aircraft with the computed profile and making corrections to the aircraft location based upon a difference between the current location and the computed profile. These corrections may be made by the aircraft pilot when the flight path profile is displayed visually, or by the autopilot system if the computer system and autopilot are properly integrated.

Having completed a description of the conventional components of the autopilot 22 and flight management computer 26, a description of controller 20 and its operation in accordance with the present invention is provided. Although controller 20 is described herein as a computer based system separate from flight management computer 26, in the preferred embodiment, controller 20 is a part of flight management computer 26. In the preferred embodiment, controller 20 generates altitude rate commands for transitioning the aircraft (1) from a level flight condition to an non-level flight condition, or (2) from a first non-level flight condition to a second non-level flight condition, e.g. from a lower altitude rate to a higher altitude rate. Transition to a level flight condition and tracking a level flight path, however, is controlled by conventional control laws which function within the autopilot 22 as discussed previously.

The altitude rate commands generated in accordance with the present invention correspond to a flight path profile stored in computer 26. Controller 20 is activated by engaging a VNAV button 68 (FIG. 3) on the autopilot control panel 36. Although the present invention retains the capability to manually select a vertical speed at thumbwheel 46 to transition to a non-level flight condition in a manner described previously, the generation of altitude rate commands to cause the aircraft to capture and track a non-level flight path corresponding to a stored flight path profile is unique to the present invention.

To generate altitude rate commands which cause the autopilot to fly the aircraft in accordance with the stored profile, reference is made to FIG. 5 where there is shown an aircraft 69, and a portion of a flight path profile including level segment 29 extending between navigational points 72, 74, and descent segment 28 extending between navigational points 74, 78. For ease of explanation, the intersection of level segment 29 and non-level segment 28 is shown to occur at navigational point 74, however, the level and non-level segments may intersect at locations other than navigational points. Descent segment 28 is defined by a characteristic altitude descent rate $\dot{h}_{path}$, as well as by a number of points along segment 28, each of which represents a separate descent path altitude, $h_{path}$. In FIG. 5, aircraft 69 is flying a path corresponding to level segment 29 which is represented by an aircraft altitude, $h_{ac}$, and an aircraft altitude rate $\dot{h}_{ac}$. When the aircraft is in level flight, the aircraft altitude rate, $\dot{h}_{ac}$, is equal to zero. In the present example, the aircraft is approaching descent segment 28. Transition to the descent segment 28 will be complete when (1) the difference $\Delta h$ between current aircraft altitude, $h_{ac}$, and the altitude, $h_{path}$, of descent path 28 equals approximately zero, and (2) the difference $\Delta \dot{h}$ between current aircraft altitude rate, $\dot{h}_{ac}$, and the altitude rate $\dot{h}_{path}$ of descent segment 28 also equals approximately zero. The present invention operates in a manner that values of $\Delta h$ and $\Delta \dot{h}$ are constantly calculated beginning at a predetermined distance from navigation point 74 along path segment 29. Controller 20 functions so that altitude rate commands are generated which cause the aircraft to fly a transition path which drives the values $\Delta h$ and $\Delta \dot{h}$ toward zero.

Transition from level flight path 29 to descent path 28 begins when a capture equation $\Delta \dot{h} + k_h \Delta h = 0$ is satisfied, where $\Delta \dot{h} = \dot{h}_{path} - \dot{h}_{ac}$ and $\Delta h = h_{path} - h_{ac}$. In general, the capture equation is satisfied whenever either (1) the quantity $\Delta \dot{h} + k_h \Delta h$ changes from a positive value to a negative value when the quantity $(h_{path} - h_{ac})$ is positive, i.e. when the non-level segment is captured from below as in FIG. 5, or (2) the quantity $\Delta \dot{h} + k_h \Delta h$ changes from a negative value to a positive value when the quantity $(h_{path} - h_{ac})$ is negative, i.e. capture from above. The altitude rate, $\dot{h}_{path}$, of descent segment 29 is computed as a function of flight path angle $\gamma$ in a manner to be discussed later. However, in order to calculate an altitude error $\Delta h$ between aircraft altitude $h_{ac}$ and descent path altitude $h_{path}$, the altitude of an extension segment 28' of descent path 28 is calculated as a function of the distance of the aircraft from a navigational point on the descent segment 28, e.g. navigational point 74. Extension segment 28' extends upwardly and rearwardly from descent path 28 to provide a reference for generating an altitude error signal in advance of aircraft 69 reaching descent path 28. As aircraft 69 approaches navigational point 74, continuous updates of $\Delta h$ as a function of a horizontal distance d between aircraft 69 and navigational point 74 are available. Continuous updates of $\Delta \dot{h}$ are also available by comparing current aircraft altitude rate, which is a conventional measurement, to the calculated altitude rate $\dot{h}_{path}$ of segment 28.

Once capture begins, i.e. the equation $\Delta \dot{h} + k_h \Delta h = 0$ is satisfied, altitude rate commands $\dot{h}_{cmd}$ are generated by controller 20 and fed to autopilot 22 in a manner to cause the aircraft to smoothly transition the aircraft to the descent path 28. These commands are generated in accordance with the equation $\dot{h}_{cmd} = \dot{h}_{path} + k_h \Delta h$ where $k_h$ is a gain factor which increases as $\Delta h$ decreases. Gain factor $k_h$ is calculated in accordance with the equation $k_h = k_{max} - k_1 |\Delta \dot{h}|$, where $k_{max}$ constitutes a maximum gain which is preferably equal to a tracking gain of the altitude hold function of autopilot 22, $|\Delta \dot{h}|$ is the absolute value of the quantity $(\dot{h}_{path} - \dot{h}_{ac})$, and $k_1$ is a selected constant. $K_{max}$ and $k_1$ are dependent upon the type of aircraft, however in a preferred embodiment of the present invention wherein the Sperry autopilot is utilized aboard a Boeing 737 aircraft, $k_{max} = 0.14$ and $k_1 = 0.001$.

During capture, the gain equation $k_h = k_{max} - k_1 |\Delta \dot{h}|$ operates in a manner that during the initial portion of capture when $\Delta \dot{h}$ is relatively large, feedback gain $k_h$ is relatively small; however, as the aircraft altitude rate approaches the altitude rate of the non-level path and $\Delta \dot{h}$ decreases, $k_h$ becomes progressively closer to the maximum feedback gain value of $k_{max}$. This results in a gain factor which is calculated so that values of $k_h$ increase, but do not decrease, as the aircraft approaches the non-level segment. A closer look at the altitude rate command equation, $\dot{h}_{cmd} = \dot{h}_{path} + k_h \Delta h$, reveals that since $\dot{h}_{path}$ remains constant for each non-level segment, the change in $\dot{h}_{cmd}$ as the aircraft approaches the non-level segment is a function of the term $k_h \Delta h$. The relationships of altitude error $\Delta h$ and altitude rate command $\dot{h}_{cmd}$ as a function of time during aircraft transition from a level segment to a descent segment is shown graphically in FIG. 6. It can be seen in FIG. 6 that upon initiation of capture, altitude error $\Delta h$ is quite large, while altitude rate command is zero because of the capture equation being satisfied. However, when altitude rate command values are generated, the aircraft altitude rate $\dot{h}_{ac}$ gradually increases in a negative direction as $\dot{h}_{cmd}$ approaches $\dot{h}_{path}$ and altitude error $\Delta h$ is driven toward zero.

It should be appreciated that term $k_h \Delta h$ regulates the amount of elevator deflection as a function of $\Delta h$ and the gain factor equation. The gain factor $k_h$ is relatively small when aircraft altitude error $\Delta h$ is large so as to initiate a gradual transition to the non-level path segment. However, as the altitude error $\Delta h$ decreases as the aircraft approaches the non-level path segment, the increasing value of altitude error gain $k_h$ approximately balances the decreasing altitude error thereby resulting in a smooth, approximately constant normal acceleration (g) transition to the non-level flight path.

Although discussion of the present invention has been limited to capture of a non-level path segment from a path segment which intersects the non-level segment, the aircraft may operate in an airmass mode where the aircraft is flying a path which is not part of the flight path profile and does not intersect the non-level path segment. In this case, it cannot be assumed that the aircraft flight path will be in a direction which will bring the aircraft within the capture limits of the non-level segment to satisfy the capture equation $\dot{h}+k_h\Delta h=0$. Therefore, if it is desired to transition to the non-level segment portion of a programmed flight path profile while in the airmass mode, engagement of VNAV button 68 causes predetermined altitude rate commands to be fed to autopilot 22 to cause the aircraft to fly in a direction toward the non-level segment. For example, if it is determined that path 28 (FIG. 5) is below aircraft 69, then altitude rate commands are generated which will cause the aircraft to descend at a faster predetermined rate than $\dot{h}_{path}$ of segment 28. On the other hand, if it is determined that the path 28 is located above the aircraft, altitude rate commands are generated which cause the aircraft to descend at a predetermined rate slower than $\dot{h}_{path}$. Once the capture equation is satisfied, however, transition to the non-level segment is initiated in accordance with the altitude rate command equation $\dot{h}_{cmd}=\dot{h}_{path}+k_h\Delta h$ in a manner discussed previously.

Figure 7B:
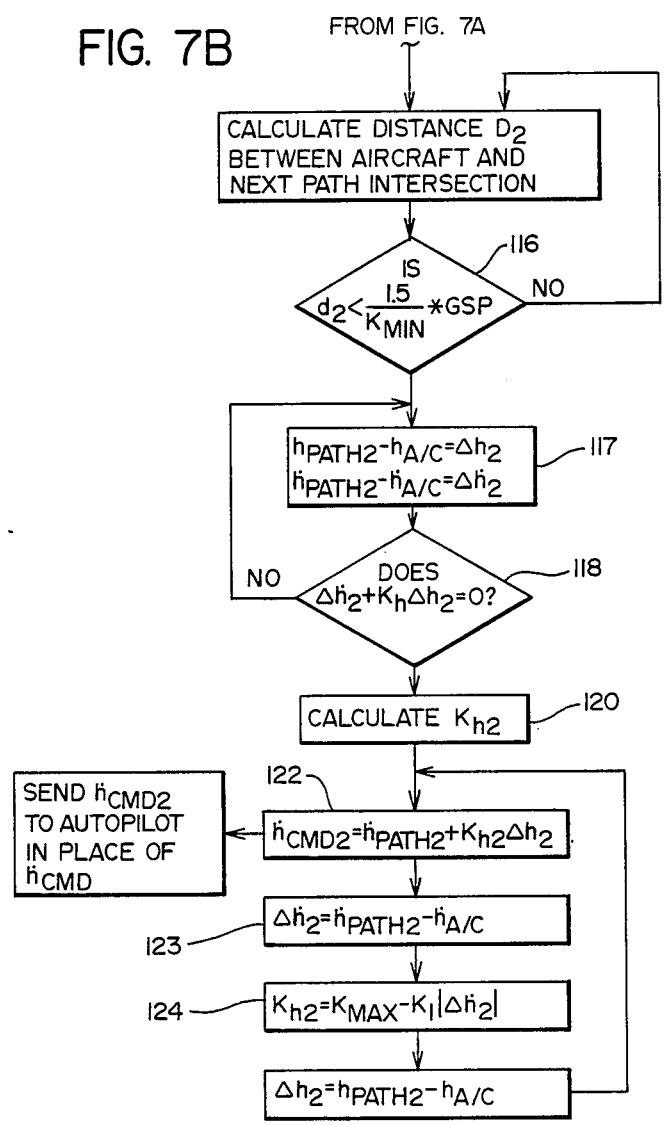

A further understanding of the present invention is provided by referring to the flow chart in FIG. 7A together with the flight path profile diagram in FIG. 5. In order to begin capture within a reasonable distance of the descent path 28, calculation of $\Delta h$, $\Delta\dot{h}$ is initiated when the horizontal distance d (FIG. 5) between the aircraft and navigational point 74 satisfies the relationship $d<1.5/k_{min} * GSP_{ac}$ where $GSP_{ac}$=the groundspeed of the aircraft in feet per second and $k_{min}$=a selected minimum value of feedback gain, which in the preferred embodiment is a value of 0.06. The distance d is calculated in a conventional manner at block 87 (FIG. 7A). If it is determined that $d<1.5/k_{min} * GSP$ at decision block 88, values of $h_{path}$ and $\dot{h}_{path}$ are calculated for path extension 28' at block 90. Path altitude rate $\dot{h}_{path}$ is computed by the equation $\dot{h}_{path}=GSP * $ tangent $\gamma$, whereas path altitude is calculated by the equation $h_{path}=h_{nav}-d * $ tangent $\gamma$, where GSP=aircraft current groundspeed in feed per second, d is the horizontal distance between the aircraft 69 and a navigational point on the non-level segment, e.g. navigational point 74, $h_{nav}$ is the altitude of navigational point 74, and $\gamma$ is the flight path angle of descent segment 28 and which is computed in a conventional manner.

For example, assume that the aircraft is at point A in FIG. 5 at an altitude of 30,000 feet which also happens to be the altitude of navigational point 74, a distance of 14,000 feet from navigational point 74, aircraft groundspeed is 600 feet per second, and the flight path descent angle $\gamma$ of segment 28 is $-3°$. The equation $d<1.5/k_{min} * GSP$ is satisfied for a value of d of less than 15,000. Therefore, assuming that distance d=14,000 feet at point A, $\Delta h=h_{path}-h_{ac}=[30,000-14,000 * \tan(-3°)]-30,000=734$ feet. The $\dot{h}_{path}$ of descent path 28 equals $600 * \tan(-3°)=-31.45$ feet per second. This value of $\dot{h}_{path}$ is a constant and only calculated once for each non-level segment.

As the aircraft approaches the non-level segment, values of $\Delta h$ and $\Delta\dot{h}$ are calculated at block 94. A value of $k_h$ is calculated at block 95 in accordance with the feedback gain equation $k_h=k_1-k_2|\Delta\dot{h}|$. Arrival at a capture point where the aircraft is caused to transition to the non-level path is determined at decision block 100 when the capture equation $\Delta\dot{h}+k_h\Delta h=0$ is satisfied. In the present example, capture occurs when $\Delta h=288$ feet. This can be shown mathematically by solving for $\Delta h$ in the capture equation as follows: $(\dot{h}_{path}-\dot{h}_{ac})+K_h(h_{path}-h_{ac})=0$, or by substitution $(-31.45-0)+K_h\Delta h=0$. Since $K_h=K_{max}-K_1|\Delta\dot{h}|$ then $K_h=0.14-0.001 * |31.45-0|=0.10855$. Substituting this value of $K_h$ into the capture equation, $\Delta h=288$ feet at capture. This occurs at a distance d from navigation point 74 of $$d = \frac{\Delta h}{\tan\gamma} = \frac{288}{.05241} = 5495 \text{ feet.}$$

When d=5495 feet, transition to the descent segment 28 is effected by setting $k_h=k_{min}$ at block 102 (FIG. 7A) and calculating $\dot{h}_{cmd}$ at block 104. The value of $\dot{h}_{cmd}$ is then fed to the autopilot 22 to cause a change in aircraft pitch angle which in turn causes a change in altitude rate error $\Delta\dot{h}$ which is calculated at block 106. In order to generate an increasing feedback gain, $k_h$ is updated at block 108, fed back to the $\dot{h}_{cmd}$ equation at block 104 and a new $\dot{h}_{cmd}$ is generated which is fed to the autopilot 22. As the aircraft transitions to the descent path 28 and $\Delta h$ decreases to zero, $k_h$ increases to $k_{max}$.

As discussed previously, if the aircraft is flying a programmed path which intersects the non-level segment, calculated values of $\Delta h$ and $\Delta\dot{h}$ will decrease as the aircraft approaches the non-level segments and the capture equation will be satisfied. On the other hand, if the determination is made at decision block 92 that the aircraft is flying in an airmass mode along a path which does not intersect with the non-level segment, then the appropriate commands are generated as discussed previously at block 93 to cause the aircraft to fly toward the non-level segment until the capture equation is satisfied, and capture is initiated.

Figure 8:
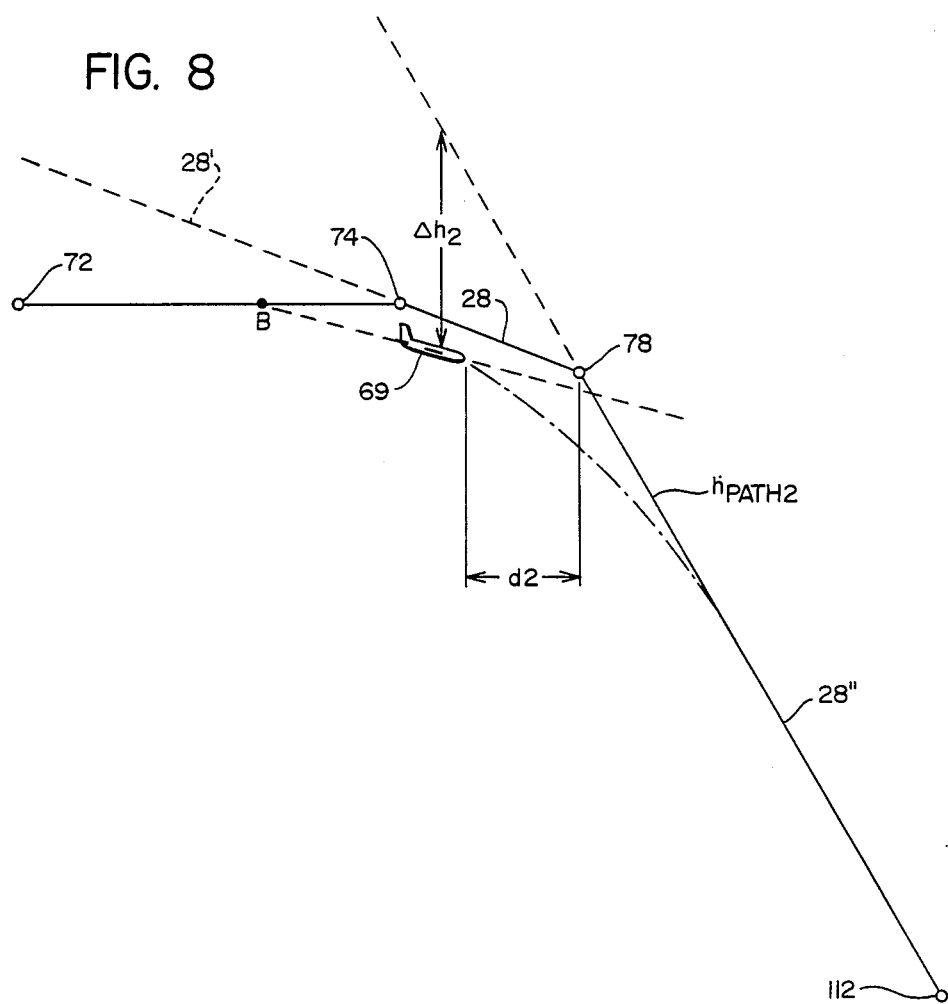
FIG. 8 is a side view of a portion of an exaggerated flight path profile illustrating the transition of an aircraft to a second descent path segment prior to completion of capture of a first descent path segment.

During transition to a non-level segment, the aircraft 69 may fly within the capture range of a succeeding non-level segment as illustrated in FIG. 8. This typically results when the current descent segment, e.g. descent segment 28, is relatively short. Therefore, to fly a transition path which smoothly intercepts the succeeding segment, e.g. descent segment 28'', capture of the succeeding descent segment 28'' occurs when the capture equation for that segment is satisfied. To prepare for a transition to a descent segment 28'' which is along a subsequent portion of the flight profile and which is defined by navigational points 78, 112, a determination is made at block 116 of the flow chart (FIG. 7B) whether the maximum range equation, $d<1.5/k_{min} * GSP$, is satisfied with respect to a distance d2 between the aircraft and navigational point on descent segment 28'', e.g. navigational point 78. When the relationship is satisfied, values of $\Delta h_2$, $\Delta\dot{h}_2$ are calculated at block 116 in a manner discussed previously and a determination is made at decision block 118 whether the capture equation $\Delta\dot{h}_2+k_h \Delta h_2=0$ has been satisfied, where $k_h=$the current feedback gain calculated for the transition to descent segment 28. If the capture equation is satisfied, then the aircraft occupies a location within the capture criteria of descent segment 28''.

Upon satisfying the capture equation for descent segment 28'', $k_h$ is reset at block 120 to a value of $k_h$ that satisfies the capture equation. A new value of $\dot{h}_{cmd2}$ is calculated at block 122 and then fed to autopilot 22 to initiate transition to descent segment 28''. As aircraft altitude and altitude rate changes in response to $\dot{h}_{cmd2}$, updated values of $\Delta h$, $\Delta\dot{h}$ and $k_{h2}$ are fed back to $\dot{h}_{cmd}$ at block 122 to generate an updated altitude rate command.

Figure 9:
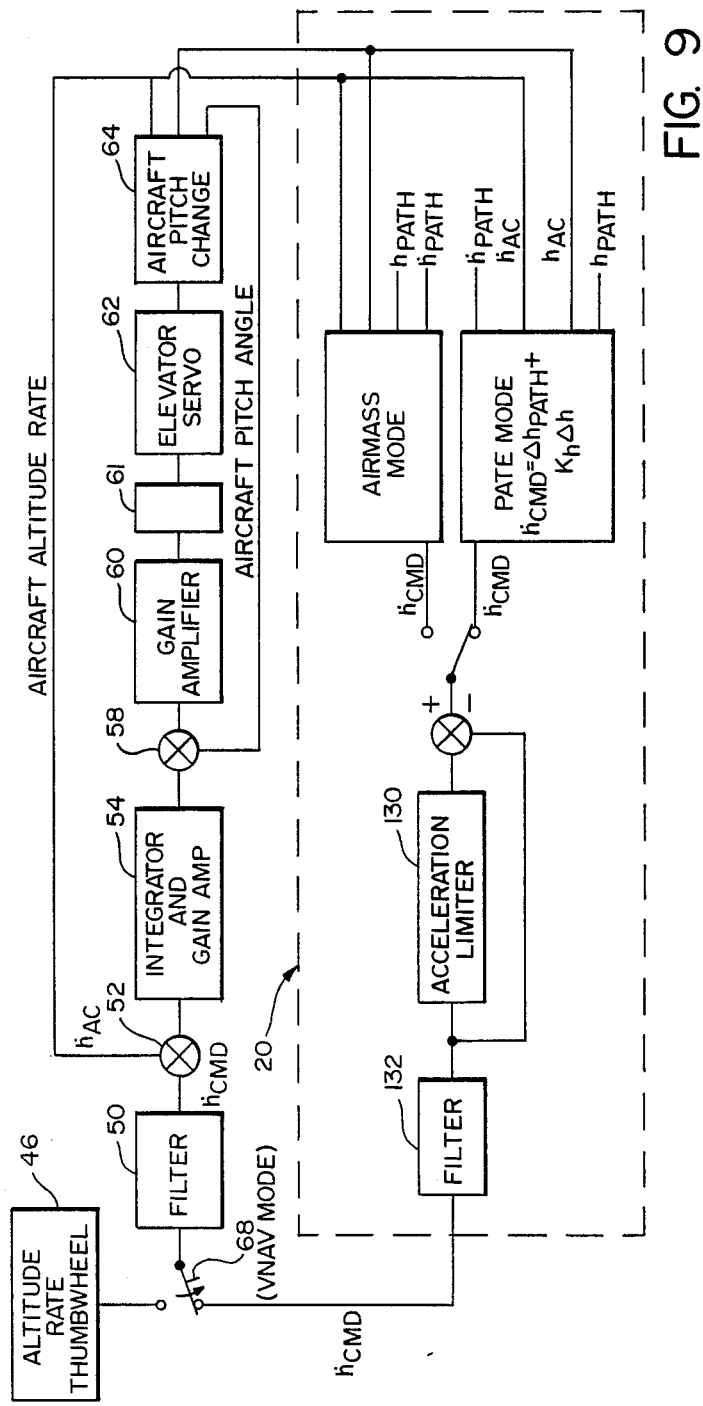
FIG. 9 is a simplified block diagram illustrating the integration of the control system of the present invention with a conventional aircraft autopilot system.
Figure 10:
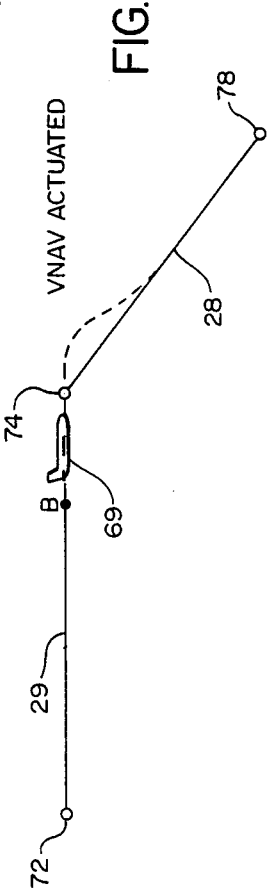
FIG. 10 is a side view of a portion of an exaggerated flight path profile showing an aircraft flight path during transition from a level segment to a non-level segment when the control system of the present invention is initiated after the aircraft has passed a calculated point for initiating capture.

Integration of controller 20 and autopilot 22 is further described with reference to the simplified block diagram of FIG. 9 where incoming values of $h_{ac}$, $h_{path}$, $\dot{h}\dot{h}d$ ac and $\dot{h}_{path}$ are processed. If the aircraft is in a path mode, path tracking continues until the capture equation is satisfied. On the other hand, if the aircraft is in an airmass mode, predetermined altitude rate commands are generated to bring the aircraft within capture range. To limit acceleration normal to the aircraft, a generated $\dot{h}_{cmd}$ is fed through a conventional acceleration limiter 130 which determines the amount of aircraft acceleration which the generated $\dot{h}_{cmd}$ will produce, and reduces that $\dot{h}_{cmd}$ if the resulting acceleration value will exceed 1 g±0.1 g. If not limited, a generated altitude rate command $\dot{h}_{cmd}$ may cause aircraft normal acceleration well in excess of 1 g. A situation likely to generate normal acceleration in excess of 1 g±0.1 g is shown in FIG. 10 where the VNAV button 68 (FIG. 9) was not engaged until after aircraft 69 had passed navigation point 74. In the present example, the generated $\dot{h}_{cmd}$ will be quite large due to the large gain $k_h$ which began increasing when the capture equation was satisfied at point B. Therefore to provide for a smooth transition to the descent path 28, the generated $\dot{h}_{cmd}$ is limited to a command which produces an acceleration during transition of 1.1 g. The resulting $\dot{h}_{cmd}$ is fed via lead/lag filter 132 (FIG. 9) to compensate for any lag. The generated $\dot{h}_{cmd}$ signal is then fed to the autopilot 22 which responds to the $\dot{h}_{cmd}$ signal in the same manner as described previously with reference to an $\dot{h}_{cmd}$ signal generated by a manual input at thumbwheel 46.

In the embodiment discussed herein, the operation of controller 20 has been described with reference to a transition to a descent path, however it should be appreciated that the present invention also may be used to transition to a flight climb path.

What is claimed is:

1. A method for controlling an aircraft to intercept a non-level flight path segment, the method comprising the steps of:
  a. determining an altitude rate of the aircraft for flying the non-level path segment;
  b. determining an altitude of a location on the path segment;
  c. determining an altitude difference between the location on the path segment and an altitude of the aircraft;
  d. generating an altitude rate command as a function of a combination of (i) the path altitude rate and (ii) an altitude term which is a function of a gain factor and the altitude difference;
  e. adjusting the altitude term so that there is an increase in the gain factor as the aircraft approaches the path segment; and
  f. responding to the altitude rate command in a manner to intercept the non-level path segment.

2. The method as set forth in claim 1 wherein:
  a. the altitude rate of the nonlevel path segment is constant; and
  b. a change in the altitude rate command for intercepting the nonlevel path segment is solely a function of the gain factor and the altitude difference.

3. The method as set forth in claim 1 additionally comprising the steps of:
  a. determining a difference between the path altitude rate and an altitude rate of the aircraft; and
  b. adjusting the gain factor as an inverse function of the altitude rate difference.

4. The method as set forth in claim 3 wherein the gain factor is calculated by the equation $k_h = k_1 - k_2 |\Delta \dot{h}|$ where $k_h$ is the gain factor, $k_1$ is a selected maximum gain constant, $k_2$ is a selected gain constant which is less than $k_1$, and $\Delta \dot{h}$ is the altitude rate difference.

5. The method as set forth in claim 3 wherein the altitude rate command is generated in a manner that the altitude rate command approaches and intercepts the nonlevel path altitude rate so that the aircraft approaches and intercepts the nonlevel path segment.

6. The method as set forth in claim 5 wherein the altitude rate of the nonlevel path segment is determined as a function of the constant flight path angle of the nonlevel path segment.

7. The method as set forth in claim 5 wherein the nonlevel path segment is determined as a function of a known angle of the nonlevel path segment and a known location of at least one point on the nonlevel path segment.

8. The method as set forth in claim 3 wherein the altitude difference is a function of (i) a slope of the non-level path segment, and (ii) a distance between the aircraft and a selected location on the non-level path segment.

9. The method as set forth in claim 8 wherein the altitude difference is calculated by the equation $\Delta h = [h_{nav} - d * \tan \gamma] - h_{ac}$, where $\Delta h$ is the altitude difference, $h_{nav}$ is the altitude of the selected location on the non-level path segment, d is the distance between the aircraft and the selected location on the non-level path segment, $\gamma$ is an angle found by the intersection of the non-level path segment and a horizontal reference, and $h_{ac}$ is the altitude of the aircraft.

10. The method as set forth in claim 9 wherein the altitude rate command is calculated by the equation $\dot{h}_{cmd} = \dot{h}_{path} + k_h \Delta h$, where $\dot{h}_{cmd}$ is the altitude rate command, $\dot{h}_{path}$ is the altitude rate of the non-level path segment, $\Delta h$ is the altitude difference, and $k_h$ is the gain factor.

11. The method as set forth in claim 10 wherein the non-level path segment has a predetermined geographical location.

12. The method as set forth in claim 11 wherein the non-level path segment is part of a predetermined flight profile.

13. The method as set forth in claim 12 wherein the generation of the altitude rate command is initiated when the equation $\Delta \dot{h} + k_h \Delta h = 0$ is satisfied, where $\Delta \dot{h}$ is the altitude rate difference, $\Delta h$ is the altitude difference, and $k_h$ is the gain factor.

14. Apparatus for controlling an aircraft to intercept a nonlevel flight path segment, the apparatus comprising:
  a. means for determining an altitude rate of the aircraft for flying the nonlevel path segment;
  b. means for determining an altitude of a location on the nonlevel path segment;
  c. means for determining an altitude difference between the location on the nonlevel path segment and an altitude of the aircraft;
  d. means for generating an altitude rate command as a function of a combination of (i) the path altitude rate and (ii) an altitude term which is a function of a gain factor and the altitude difference;
  e. means for increasing the gain factor as the aircraft approaches the nonlevel path segment; and
  f. means for responding to the altitude rate command to cause the aircraft to intercept the nonlevel path segment.

15. The apparatus as set forth in claim 14 wherein the altitude rate command is generated when the equation $\Delta \dot{h} + k_h \Delta h = 0$ is satisfied, where $\Delta \dot{h}$ is the altitude rate difference, $\Delta h$ is the altitude difference, and $k_h$ is the gain factor.

16. The apparatus as set forth in claim 14 additionally comprising:
   a. means for determining a difference between the nonlevel path altitude and an altitude rate of the aircraft; and
   b. means for adjusting the gain factor as an inverse function of the altitude rate difference.

17. The apparatus as set forth in claim 16 wherein the adjusting means includes means for determining the gain factor by the equation $k_h = k_1 - k_2 \Delta h$ where $k_h$ is the gain factor, $k_1$ is a selected maximum gain constant, $k_2$ is a selected gain constant which is less than $k_1$, and $\Delta h$ is the altitude rate difference.

* * * * *